(No Model.) 2 Sheets—Sheet 1.
W. S. LOVELAND & E. C. HENN.
LATHE.
No. 471,674. Patented Mar. 29, 1892.
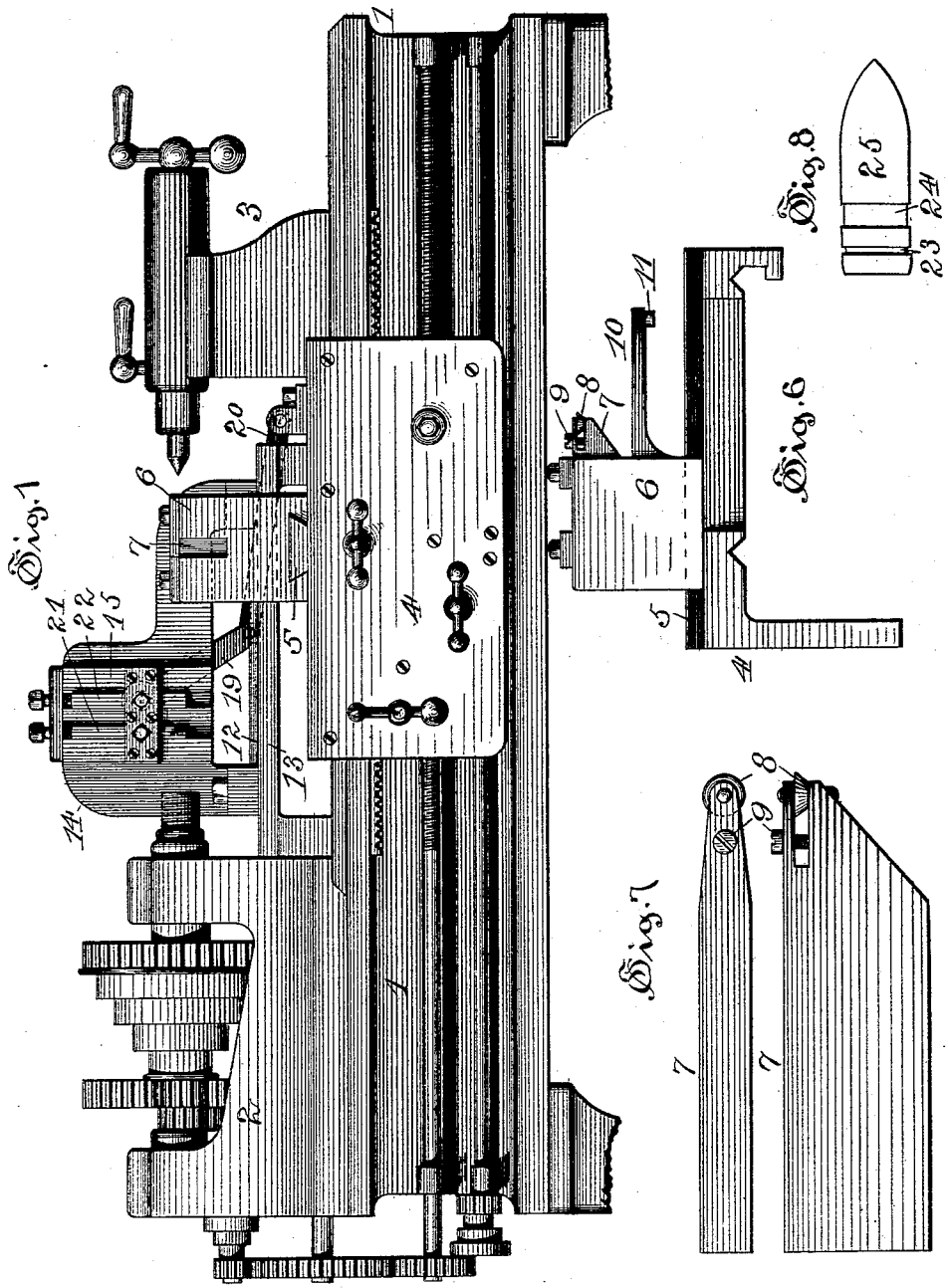
Witnesses:
A. P. Jenkins.
H. T. Giddings.
Inventors:
Walter S. Loveland, and
Edwin C. Henn, by
Harry P. Williams, atty.
THE NORRIS PETERS CO., PHOTO-LITHO., WASHINGTON, D. C.

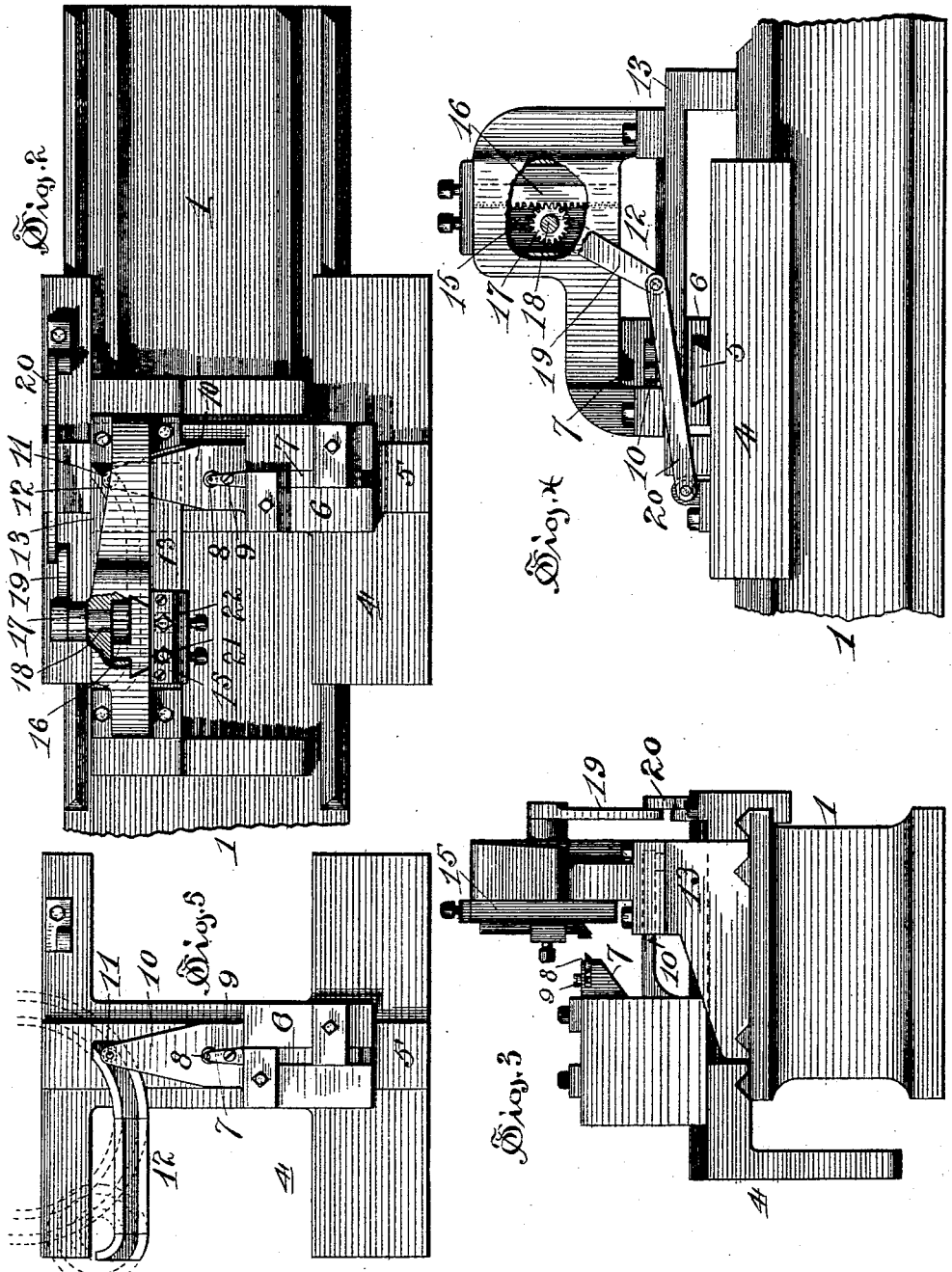

UNITED STATES PATENT OFFICE.

WALTER S. LOVELAND, OF HARTFORD, AND EDWIN C. HENN, OF BLOOMFIELD, CONNECTICUT.

LATHE.

SPECIFICATION forming part of Letters Patent No. 471,674, dated March 29, 1892.

Application filed November 10, 1891. Serial No. 411,464. (No model.)

*To all whom it may concern:*

Be it known that we, WALTER S. LOVELAND, residing at Hartford, and EDWIN C. HENN, residing at Bloomfield, in the county of Hartford and State of Connecticut, both citizens of the United States, have invented certain new and useful Improvements in Lathes, of which the following is a full, clear, and exact specification.

This invention relates to the class of engine or self-acting lathes for turning articles into irregular shapes or forms having diameters of varying lengths, the object being to provide a simple lathe of this class in which an article may be turned to a regular or irregular shape by a cutter moving in one direction and by other cutters moving in a different direction at the same time be provided with grooves, mortises, or finishing cuts which the first cutter would be unable to effect, economizing in time and labor.

To this end the invention resides in a lathe having a cutter that automatically travels longitudinally with the axis, or axially, and one or more cutters that move radially or tangentially—that is, at an angle with the axis of the article being turned—the action of one cutter being dependent upon and moving in relation with the movement of the others, whereby an article may be turned to a regular or irregular shape by the axially-moving cutter and simultaneously finished by the angularly-moving cutters, or provided with mortises and grooves, which the axially-moving cutters guided by a pattern would not be able to cut.

Referring to the accompanying drawings, Figure 1 is a front elevation of a back-geared engine-lathe embodying the improvements. Fig. 2 is a plan with the head and tail stocks removed. Fig. 3 is an end elevation of the same. Fig. 4 is a rear elevation with a portion broken away to show the construction. Fig. 5 is a detail plan of the compound carriage bearing the axially-moving cutter, showing the pattern-guide. Fig. 6 is a side elevation of the same. Fig. 7 shows an enlarged plan and side view of the axially-moving cutting-tool, and Fig. 8 is a view of an article produced by the operation of the lathe shown.

In the views, where the invention is illustrated as applied to a back-geared engine-lathe having a compound feed, 1 indicates the shears or bed, which supports a head-stock 2, bearing the customary driving-gears and speed-pulley for rotating the live-spindle to which the blank to be turned is secured, any ordinary adjustable tail-stock 3 with a dead-spindle for centering and supporting the blank while being turned, and the common shafts and screws for feeding and returning the carriage 4, which travels longitudinally on ways along the bed. On this carriage and preferably movable longitudinally toward and from the axis of the work on a tenoned way 5 is a slide or block 6, holding a cutting-tool 7. This tool is preferably temporarily adjustably clamped in a socket in the block and in a mortise in its end has a cutting-disk or annular cutter 8, placed on a pivot and clamped in the mortise by a screw 9.

Projecting from the block below the tool is an arm 10, bearing a pin or roll 11, adapted to run in the guiding-groove of the pattern 12, so that the block is moved toward or from the axis of the work on the tenoned way by this arm in contact with the pattern as the carriage travels along the bed. The guiding-groove of the pattern, which follows the desired contour, is preferably cut in sections, each straight portion of the groove being milled in plates in sections of the proper length, while each curved section is cut on a lathe in a separate plate as a segment of a circle. These plates, in which the sections of the pattern-groove are cut, are secured to a bridge-plate 13, attached to the top of the bed. Bolted to this bridge or otherwise secured to the bed is a standard 14, supporting a slide 15. This standard preferably rises vertically and has a mortise to receive a dovetailed tenon on the back of the slide, to which is secured a rack 16. In mesh with this rack is a pinion 17 upon a journal 18, supported by the standard. On the end of this journal is an arm 19, that is connected by a link 20 with the carriage 4. As the carriage 4 travels longitudinally the link rocks the arm 19 and oscillates the pinion, which, through the rack, raises or lowers the slide 15, according to the direction of movement of the carriage. Adjustably clamped to this slide are tools 21 22, each having a cutting-edge of the required shape to form a mortise or groove as they move tangentially or radially toward the work which is being shaped by the cutter 8.

In Fig. 8 is illustrated a projectile which would be formed by a lathe constructed as above described. A blank of approximately the required shape is secured upon the live spindle, supported by the dead-center, and given a rotation. The carriage 4 is fed by the common feeding mechanism axially or longitudinally with the axis of the work, and the block 6, bearing the cutter 8, is drawn toward or pushed from the axis of the work by the arm in contact with the guide, according to the outline of the pattern, while traveling longitudinally to shape the blank. In the form shown the pattern draws the cutter to simply point a projectile as the carriage moves longitudinally along the bed, and this causes the tool 21 to cut the groove 23 and the tool 22 to cut the mortise 24 in the projectile 25. The cutters that cut across the axis are positively connected with the longitudinally-moving carriage. Therefore the amount of their cutting is relative with the moving—consequently cutting—of the axial cutter, so that with the construction shown an article may be shaped and simultaneously grooved and mortised with a consequent saving of time and labor.

The outline of the pattern may be changed as desired; but it is impossible to make an automatically and axially moving cutter follow a pattern inward at right angles to the general axial movement and cut a square shoulder or sharp angle; but with a lathe provided with mechanism as described the axially-moving cutter may be drawn by the pattern to roughly form a round shoulder or sharp taper, and after it has passed to another part of the work the angularly-moving cutter may be adjusted to feed up and square off the corner forming a right-angular shoulder. Of course it is not essential to the invention that the cutter-slides, which move tangentially or radially toward the work—that is, angularly with the axis—should be reciprocated by means of the exact connections shown, as a rack could be secured to the carriage for rotating the pinion, or the slides could be reciprocated by means of a cam or wedge attached to the carriage, which are equivalent mechanisms performing the same operations.

In turning projectiles or other articles which are required to be of a high degree of exactness it is essential that the diameter of the axially-moving cutter be the same as the diameter of the pin or roller that runs in the pattern-guide, in order that the periphery of the cutter shall follow and cut on the same circle as the pattern. The rotary cutting-disks, which are easily made to comply with this feature, are cheap in construction, readily sharpened, can be easily inserted in place, and when dulled turned to present a sharp portion of the periphery. The connected, dependent, and relatively-moving adjustable cutters may be applied to any common form of engine-lathe and will shape and finish at once regular or irregular articles, according to the pattern desired.

By making the pattern in sections not only is the expense attached to the milling thereof greatly reduced, but the sections can readily be detached and rearranged and placed in various relations with each other, thus enabling the operator to make many changes in the work without the requirement of a large stock of patterns.

We claim as our invention—

1. In combination with an engine-lathe, an axially-moving carriage bearing a cutting-tool and a stationary standard supporting a slide having a movement at an angle with but connected to the axially-moving carriage and bearing a cutting-tool, substantially as specified.

2. In combination with an engine-lathe, an axially-moving carriage supporting a transversely-moving block bearing a cutting-tool and a stationary standard supporting a slide having a movement at an angle with but connected to the axially-moving carriage and bearing a cutting-tool, substantially as specified.

3. In combination with an engine-lathe, an axially-moving carriage supporting a transversely-moving block having an arm in contact with a pattern and bearing a cutting-tool and a stationary standard supporting a slide having a movement at an angle with but connected to the axially-moving carriage and bearing a cutting-tool, substantially as specified.

4. In combination with an engine-lathe, an axially-moving carriage bearing a cutting-tool, a stationary standard supporting a slide having a movement at an angle with the axially-moving carriage and bearing a cutting-tool, a rack connected with the slide, a pinion meshing with the rack, and a connection attached to the carriage for oscillating the pinion, substantially as specified.

5. In combination with an engine-lathe, an axially-moving carriage supporting a transversely-moving block bearing a cutting-tool, a stationary standard supporting a slide having a movement at an angle with the axially-moving carriage and bearing a cutting-tool, a rack connected with the slide, a pinion meshing with the rack, and a connection attached to the carriage for oscillating the pinion, substantially as specified.

6. In combination with an engine-lathe, an axially-moving carriage supporting a transversely-moving block having an arm in contact with a pattern and bearing a cutting-tool, a stationary standard supporting a slide having a movement at an angle with the axially-moving carriage and bearing a cutting-tool, a rack connected with the slide, a pinion meshing with the rack, and a connection attached to the carriage for oscillating the pinion, substantially as specified.

7. In combination with an engine-lathe having an axially-moving carriage supporting a transversely-moving block having an arm in contact with a pattern and bearing a cutting-tool and a pattern consisting of a grooved way formed in detachable sections, the sections being divided on the radii of the various circles forming the curves of the pattern, substantially as specified.

8. The combination, with an engine-lathe having an axially-moving carriage supporting a transversely-moving block having an arm in contact with a pattern and bearing an annular rotary cutting-blade, of a pattern consisting of a grooved way, formed in detachable sections, the sections being divided on the radii of various circles forming the curves of the pattern, substantially as set forth.

9. In combination with an engine-lathe having an axially-moving carriage supporting a transversely-moving block having an arm in contact with a pattern and a tool supported by said block, said tool having an annular rotary cutting-blade with a periphery of the same contour as the portion of the pin or roller that is in contact with the pattern, substantially as specified.

WALTER S. LOVELAND.
EDWIN C. HENN.

Witnesses:
H. R. WILLIAMS,
ARTHUR B. JENKINS.